United States Patent
Kraus et al.

(10) Patent No.: US 11,168,566 B2
(45) Date of Patent: Nov. 9, 2021

(54) TURBINE BLADE COMPRISING A CAVITY WITH WALL SURFACE DISCONTINUITIES AND PROCESS FOR THE PRODUCTION THEREOF

(71) Applicant: MTU Aero Engines AG, Munich (DE)

(72) Inventors: Juergen Kraus, Dachau (DE); Hermann Klingels, Dachau (DE); Manfred Feldmann, Eichenau (DE)

(73) Assignee: MTU AERO ENGINES AG, Munich (DE)

(*) Notice: Subject to any disclaimer, the term of this patent is extended or adjusted under 35 U.S.C. 154(b) by 1051 days.

(21) Appl. No.: 15/368,907

(22) Filed: Dec. 5, 2016

(65) Prior Publication Data
US 2018/0156037 A1 Jun. 7, 2018

(51) Int. Cl.
*F01D 5/14* (2006.01)
*F01D 5/18* (2006.01)
*F01D 9/04* (2006.01)
*F01D 5/16* (2006.01)

(52) U.S. Cl.
CPC ............... *F01D 5/147* (2013.01); *F01D 5/16* (2013.01); *F01D 5/18* (2013.01); *F01D 9/041* (2013.01); *F05D 2220/32* (2013.01); *F05D 2230/31* (2013.01); *F05D 2240/126* (2013.01); *F05D 2240/301* (2013.01); *F05D 2260/961* (2013.01); *F05D 2300/174* (2013.01); *F05D 2300/177* (2013.01)

(58) Field of Classification Search
CPC . F01D 5/147; F01D 5/16; F01D 25/04; F01D 25/06
USPC ........................................................ 416/233
See application file for complete search history.

(56) References Cited

U.S. PATENT DOCUMENTS

| | | | | |
|---|---|---|---|---|
| 6,033,186 A * | 3/2000 | Schilling | ................. | B63H 1/26 416/233 |
| 6,039,542 A * | 3/2000 | Schilling | ................. | F01D 5/16 416/224 |
| 6,048,174 A * | 4/2000 | Samit | ...................... | F01D 5/147 416/223 A |
| 6,099,257 A * | 8/2000 | Schilling | ................ | F01D 5/147 416/223 A |
| 6,364,616 B1 * | 4/2002 | Stevenson | .............. | B64C 11/00 416/224 |
| 7,810,237 B2 | 10/2010 | Lange | | |
| 2001/0002667 A1 | 6/2001 | Jones et al. | | |
| 2005/0169754 A1* | 8/2005 | Surace | ..................... | F01D 5/16 416/97 R |

(Continued)

FOREIGN PATENT DOCUMENTS

| | | |
|---|---|---|
| DE | 10319494 A1 | 11/2004 |
| DE | 102004057865 A1 | 6/2006 |

(Continued)

*Primary Examiner* — David Hamaoui
*Assistant Examiner* — Andrew J Marien
(74) *Attorney, Agent, or Firm* — Abel Schillinger, LLP

(57) ABSTRACT

The invention relates to a turbine blade which comprises at least one cavity that is defined by a wall with one or more surface discontinuities which preferably are selected from elevations, depressions and undercuts and preferably change at least one eigenmode of the blade. The blade may suitably be produced by a generative production method such as selective laser melting (SLM).

20 Claims, 2 Drawing Sheets

(56) References Cited

U.S. PATENT DOCUMENTS

| | | | |
|---|---|---|---|
| 2005/0249601 A1* | 11/2005 | Burdgick | F01D 5/147 416/229 A |
| 2008/0298976 A1 | 12/2008 | Kriegl | |
| 2009/0022599 A1* | 1/2009 | Burdgick | F01D 5/147 416/230 |
| 2010/0202889 A1 | 8/2010 | Klingels et al. | |
| 2010/0221113 A1* | 9/2010 | Cairo | F04D 29/023 416/193 A |
| 2011/0052412 A1 | 3/2011 | Ader et al. | |
| 2011/0211965 A1* | 9/2011 | Deal | F01D 5/147 416/223 R |
| 2012/0102701 A1 | 5/2012 | Borufka et al. | |
| 2012/0128480 A1 | 5/2012 | Gomez | |
| 2013/0287590 A1 | 10/2013 | Neuhaeusler et al. | |
| 2014/0044526 A1 | 3/2014 | Humhauser | |
| 2014/0072432 A1 | 3/2014 | Woehler et al. | |
| 2014/0112796 A1* | 4/2014 | Kray | F04D 29/023 416/226 |
| 2014/0170435 A1* | 6/2014 | Hui | F01D 5/147 428/613 |
| 2014/0301840 A1 | 10/2014 | Hein et al. | |
| 2015/0322797 A1* | 11/2015 | Snyder | F01D 5/16 416/229 R |
| 2016/0084089 A1* | 3/2016 | Blaney | B22F 5/04 415/115 |
| 2016/0115820 A1* | 4/2016 | Prentice | B22C 9/108 415/200 |
| 2016/0252104 A1* | 9/2016 | Hui | F01D 5/147 416/229 A |
| 2016/0319669 A1* | 11/2016 | Morris | F01D 5/16 |
| 2017/0175776 A1* | 6/2017 | Theratil | F01D 5/16 |
| 2018/0355733 A1* | 12/2018 | Dolan | B23K 1/0018 |

FOREIGN PATENT DOCUMENTS

| | | |
|---|---|---|
| DE | 102006049216 A1 | 4/2008 |
| DE | 102008027315 A1 | 12/2009 |

* cited by examiner

TURBINE BLADE COMPRISING A CAVITY WITH WALL SURFACE DISCONTINUITIES AND PROCESS FOR THE PRODUCTION THEREOF

BACKGROUND OF THE INVENTION

1. Field of the Invention

The present invention relates to a turbine blade or vane and in particular, a blade or vane for a turbomachine such as a gas turbine, as well as to a process for the production of such a blade or vane.

2. Discussion of Background Information

In gas turbines with axial flow such as aircraft engines, guide blades (in the following, blades and vanes will collectively be referred to as "blades") and moving blades are usually situated in alternation one after the other in a housing in the compressor and turbine stages. Moving blades form the moving and rotating part of the gas turbine via which the flowing operating medium is either compressed or depressurized. With the aid of guide blades, the flow created by the moving blades may be forwarded in a defined manner.

Because of their material elasticity, blades have natural modes or eigenmodes. Modes are understood here in a conventional manner to mean natural frequencies and/or forms, in particular a first or higher bending or torsion natural form or frequency.

During operation of the turbomachine, blades are induced to vibrate, in particular because of unsteady interactions with the working fluid of the turbomachine. If such an excitation is in the proximity of a natural frequency, resonances or fluttering may occur, which affects the transformation of energy with the working fluid and strains the turbomachine, in particular its blades.

It is thus known to mistune blades with one another i.e., arranging blades with different eigenmodes in such a way that an excitation always coincides only with the natural frequency of a portion of the blades. On the other hand, "mistuned" blades with other natural frequencies may advantageously reduce the resonance or fluttering.

In view of the foregoing it would be advantageous to have available a turbine blade which comprises at least one cavity and whose eigenmodes can be readily tailored and in particular, can be produced by a process by which the burdensome processing of an already manufactured (e.g. cast) blade in order to change and/or adjust at least one eigenmode of the blade can be avoided.

DISCLOSURE OF THE INVENTION

The turbine blade of the present invention comprises at least one (for example, only one) cavity. The at least one cavity is defined by a wall with one or more surface discontinuities which are preferably selected from one or more of elevations, depressions and undercuts.

In one aspect of the blade, the one or more surface discontinuities may comprise at least one or more elevations. For example, the maximum height of at least one of these one or more elevations (corresponding to the maximum wall thickness of the blade at the site of the elevation) may be at least about twice the wall thickness in the area which is immediately adjacent to the elevation and/or may be at least about twice the minimum wall thickness of the blade.

In another aspect of the blade, two elevations on opposite sides of the wall that defines the cavity may be in contact with each other and/or together may be combined to form a web (bridge) inside the cavity.

In another aspect, the blade may be a guide vane of a gas turbine or the blade may be a rotating blade of a gas turbine.

In yet another aspect of the blade, at least one of the one or more surface discontinuities may change at least one eigenmode of the blade compared to a blade without the at least one surface discontinuity.

In a still further aspect, at least the blade leaf may be produced by a generative production method, for example, by selective laser melting (SLM).

In another aspect, at least a part of the blade (and in particular the blade leaf or a portion) may be made from a Ti alloy and in particular, a TiAl alloy. Additionally or alternatively, at least a part of the blade (and in particular the blade leaf or a portion thereof) may be made from a Ni-base alloy.

The present invention also provides a turbine, e.g., a gas turbine, which comprises one or more turbine blades as set forth above.

The present invention also provides a blade arrangement of a turbine. The blade arrangement comprises at least one blade as set forth above. For example, the blade arrangement may comprise two adjacent blades as set forth above, which blades differ only in that the one or more surface discontinuities of their cavity walls are different to thereby provide adjacent blades with at least one different eigenmode.

The present invention also provides a process for making a turbine blade which comprises at least one cavity and in particular, for making a blade as set forth above. The process comprises building up at least the part of the blade which comprises the at least one cavity by a generative production method which comprises forming one or more surface discontinuities preferably selected from elevations, depressions and undercuts in the surface of the wall which defines the at least one cavity.

The present invention also provides a turbine blade which is obtainable by the above process.

The basic concept underlying the present invention is that eigenmodes of a turbine blade comprising a cavity can be adjusted already during the production of the blade, i.e., without having to resort to burdensome processing of an already produced blade. In particular, it has been found that the surface of the wall that defines the cavity can be provided with discontinuities in the form of elevations, depressions and undercuts at virtually any location on the surface and that these surface discontinuities can be formed already during the production of the blade (and in particular, the blade leaf) by using a generative production method such as selective laser melting (SLM). If a blade with a cavity is produced in the conventional way by casting, the wall thickness has to change continuously in radial direction in order to avoid the formation of pores, pipes and other defects in the blade. This makes it impossible to introduce discontinuities such as elevations in the surface of the wall of the cavity already during the production process. In view thereof, in order to introduce discontinuities such as elevations in the wall that defines the at least one cavity of the blade, the wall thickness of the already produced blade has to be changed (reduced) later in one or more areas of the blade by a complicated and expensive material removal process inside the cavity such as EDM (Electric Discharge Machining), ECM (Electrochemical Machining) or PECM (Precise Electrochemical Machining) Material removal processes are also disadvantageous in that removed material is a waste of (often very expensive) material employed for making the blade.

In addition, cast blades usually comprise a second opening (in addition to the opening required for introducing material during the casting process) in order to stably hold the core during the production process. In the finished blade this second opening may later cause problems such as flow of hot gases into the cavity and sulfidation. A generative production method avoids these disadvantages as well.

Generative production methods in general are well known. In these methods, three-dimensional structures are produced by selectively sintering powder, for example by means of laser or electron beams which are guided over powder arranged in layers. Methods of this type have been proposed for a multiplicity of materials and for a wide variety of components, in particular also aircraft turbine components. Examples of these methods are disclosed in, e.g., DE 103 19 494 A1, DE 10 2006 049 216 A1, DE 10 2004 057 865 A1, DE 10 2008 027 315 A1 and DE 109 03 436 C2, the entire disclosures of which are incorporated by reference herein.

As mentioned above, the one or more surface discontinuities in the cavity of the blade may comprise one or more elevations. At least one of these elevations may have a maximum height or thickness (at the peak of the elevation) which is at least about 200% of the wall thickness in the area which is immediately adjacent to the elevation. For example, if the wall in the area immediately adjacent to the elevation has a thickness of e.g., 0.5 mm, the maximum wall thickness of the elevation would be 1.0 mm (including 0.5 mm contributed by the wall without elevation).

If two elevations in the wall that defines the cavity (of the same or different peak height) are opposite to each other they can, for example, be high enough to come into contact with each other. In fact, in this case the elevations together may even form a web or bridge across the cavity. This may be desirable if stiffening of the blade is desired. It should also be kept in mind here that while the elevations may be and often will be made of the same material (powder) as the material from which the blade is made the elevations, or at least some of them, may be made from a different material (which would also be very difficult to achieve, if not impossible, in the case of casting the blade).

At least the leaf (airfoil) of the cavity-containing blade of the present invention or a portion thereof is produced by a generative production method. A preferred generative production method is selective laser melting (SLM), but other generative production methods may be used as well, as long as they make it possible to form surface discontinuities in the wall of the blade cavity during the production of the blade. Examples of such methods include electron beam sintering, laser engineered net shaping (LENS), a laser forming method and a laser build-up welding method.

The generative production method can be carried out in a vacuum or in a protective gas atmosphere or in appropriate combinations of vacuum and protective gas atmosphere. By way of example, SLM can be effected in a vacuum.

It is possible to use an extremely wide variety of powders in the generative production method, in particular different metallic powders, where the powder particles can be formed from pure metals or from alloys. The powder can be formed, for example, from titanium aluminide alloys or components for producing titanium aluminide alloys, for example titanium powder, aluminum powder and/or powder made up of alloying constituents such as niobium or the like.

The powder can be mechanically alloyed, i.e. can be appropriately treated with corresponding additional powders. Moreover, a specific grain size distribution can also be set for the powder particles.

It also is possible for differently alloyed powder and/or powder set differently in terms of powder size to be provided in different regions of the blade to be produced, so that a component with a material gradient may arise.

The powder can be produced by known methods. In particular, it is possible to employ atomization of a molten material, for example by rotary atomization.

Further, at least a part of the blade (and in particular the blade leaf or at least a portion thereof) is preferably made from a Ti alloy and in particular, a TiAl material, and/or from a Ni-base alloy.

Various TiAl materials are suitable. In the present disclosure, a TiAl material is understood to be any material having, in its lattice structure, a component of an intermetallic phase such as y-TiAl or $\alpha_2$-$Ti_3Al$. Alloys having corresponding TiAl phases also come under the term TiAl material, such as alloys with niobium, boron, manganese, that is to say what are termed TNB or TNM alloys.

For the selective laser melting the TiAl or other material is used in powder form. The powder may have a grain size distribution, e.g. a normal distribution. The grain size of the material powder can be chosen such that the grain size distribution has a maximum in the region between 20 μm and 50 μm.

In order to achieve high strength in powder materials, a high-purity starting powder can be used. Such a powder can for example be produced by means of the EIGA (Electrode Induction Melting Gas Atomization) method.

Examples of other materials which are suitable for making the blade of the invention or at least parts thereof include cobalt-base alloys, MCrAl alloys where M is Ni or Co, tungsten and tungsten alloys.

BRIEF DESCRIPTION OF THE DRAWINGS

The invention is explained in more detail below on the basis of an exemplary embodiment with reference to the accompanying figures, in which.

DETAILED DESCRIPTION OF EMBODIMENTS OF THE INVENTION

Figure 1:
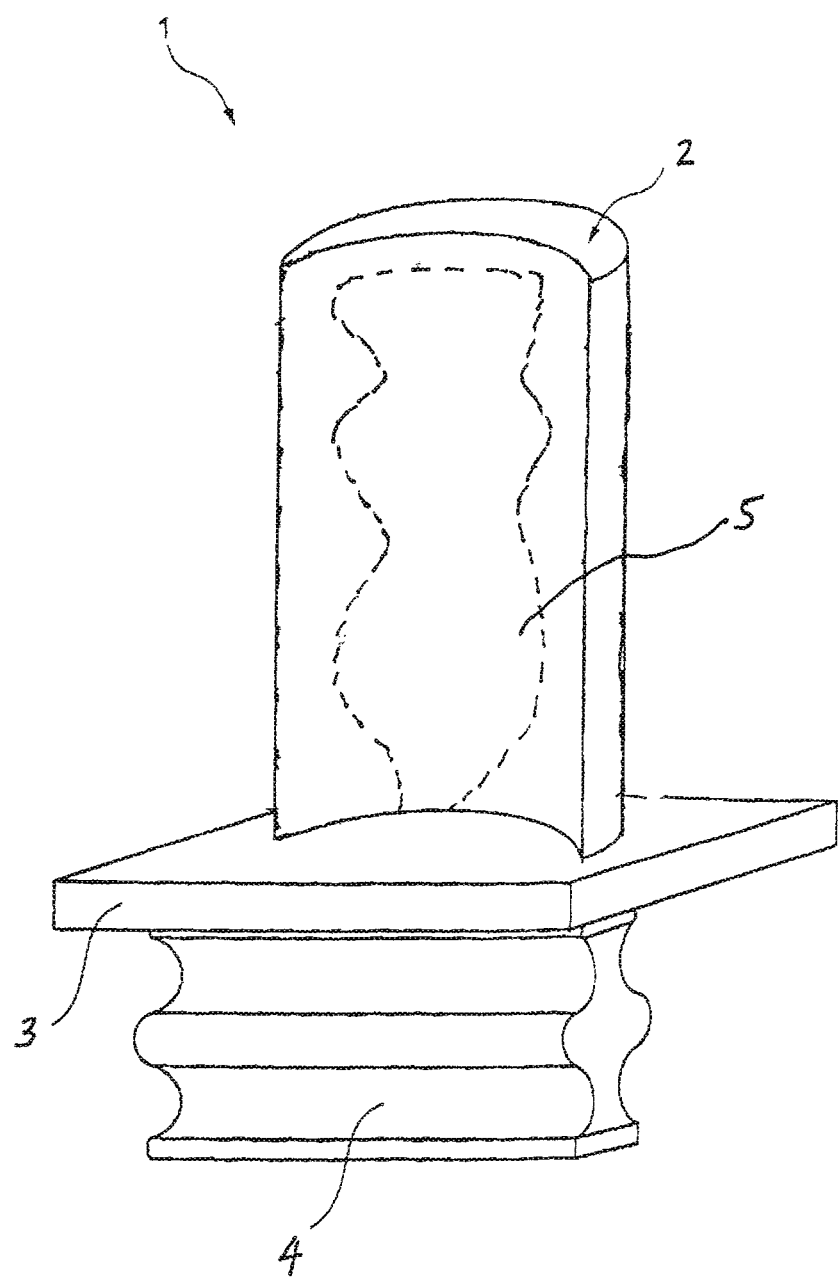
FIG. 1 shows a turbine blade with a cavity.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

In the drawings elements that are the same are provided with the same reference numbers.

FIG. 1 schematically illustrates a turbine blade 1 which consists of a (hollow) blade leaf (airfoil) 2 and a blade root with a platform 3 which carries the blade leaf and a connection 4 for connecting the blade to the hub of a turbomachine. The cavity 5 inside the blade leaf 2 is shown with a dotted line.

Figure 2:
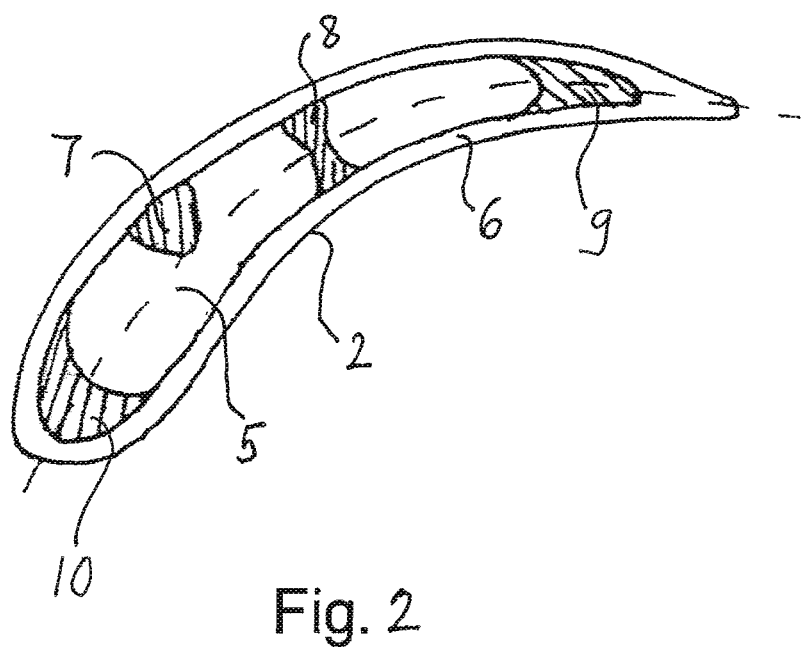
FIG. 2 shows a cross-section of the leaf of the blade of FIG. 1 perpendicular to the radial direction.

FIG. 2 shows a cross-section of the blade leaf 2 perpendicular to the radial direction with elevations 7 and 8 on the surface of the wall 6 that defines the cavity 5. Elevation 7 can be seen to be thicker than the underlying portion of the wall 6. Elevation 8 can be thought of as a combination of two elevations on exactly opposite sides of the wall, thereby forming a bridge across the cavity 5 (which may make the blade stiffer). Elevations 9 and 10 are located at end portions of the cavity 5. Elevations 7 to 10 can be made of the same or a different material. For example, some or all of the elevations 7 to 10 can be made of the same material as the wall 6 and some of the elevations 7 to 10 may be made of a material that is different from the material of the wall 6.

Although the present invention has been described in detail with reference to exemplary embodiments, it will be obvious to a person skilled in the art that the invention is not restricted to this exemplary embodiment, rather that changes or extensions are possible in a manner which omits individual features or creates various combinations of features, without departing from the scope of protection of the appended claims. In particular, the present invention encompasses all combinations of all presented individual features.

The invention claimed is:

1. A turbine blade which comprises at least one cavity, wherein the at least one cavity is defined by a wall having one or more surface discontinuities which comprise at least one elevation, a maximum height of the at least one elevation being at least twice a wall thickness in an area immediately adjacent to the at least one elevation and/or the maximum height of the at least one elevation being at least twice a minimum wall thickness of the blade.

2. The turbine blade of claim 1, wherein the maximum height of the at least one elevation is at least twice the wall thickness in an area immediately adjacent to the at least one elevation.

3. The turbine blade of claim 1, wherein the maximum height of the at least one elevation is at least twice the minimum wall thickness of the blade.

4. The turbine blade of claim 1, wherein two elevations on opposite sides of the wall are in contact with each other.

5. The turbine blade of claim 1, wherein the turbine blade is a guide vane of a gas turbine.

6. The turbine blade of claim 1, wherein the turbine blade is a rotating blade of a gas turbine.

7. The turbine blade of claim 1, wherein at least one of the one or more surface discontinuities changes at least one eigenmode of the blade compared to a blade without the at least one surface discontinuity.

8. The turbine blade of claim 1, wherein the turbine blade comprises a blade root and a blade leaf and at least the blade leaf is produced by a generative production method.

9. The turbine blade of claim 8, wherein the generative production method comprises selective laser melting (SLM).

10. The turbine blade of claim 1, wherein at least a part of the blade is made from a Ti alloy.

11. The turbine blade of claim 10, wherein the Ti alloy is or comprises a TiAl alloy.

12. The turbine blade of claim 1, wherein at least a part of the blade is made from a Ni-base alloy.

13. A turbine, wherein the turbine comprises the turbine blade of claim 1.

14. A blade arrangement of a turbine, wherein the blade arrangement comprises the turbine blade of claim 1.

15. The blade arrangement of claim 14, wherein the blade arrangement comprises two adjacent blades each of which comprises at least one cavity which is defined by a wall with one or more surface discontinuities, which blades differ only in that the one or more surface discontinuities of their cavity walls are different to thereby provide adjacent blades with different eigenmodes.

16. The turbine blade of claim 1, wherein two elevations on opposite sides of the wall are combined to form a web or bridge inside the cavity.

17. The turbine blade of claim 1, wherein the one or more surface discontinuities further comprise at least one depression.

18. The turbine blade of claim 1, wherein the one or more surface discontinuities further comprise at least one undercut.

19. A turbine blade which comprises at least one cavity, wherein the at least one cavity is defined by a wall having one or more surface discontinuities which comprise at least one depression.

20. A process for making the turbine blade of claim 1, wherein the process comprises building up at least a part of the blade that comprises the at least one cavity by a generative production method which includes forming the one or more surface discontinuities.

* * * * *